March 8, 1955 A. LONGACRE 2,703,880
RADIO OBJECT LOCATING SYSTEM
Filed May 2, 1945

INVENTOR.
ANDREW LONGACRE
BY
William D. Hall
ATTORNEY

United States Patent Office 2,703,880
Patented Mar. 8, 1955

2,703,880

RADIO OBJECT LOCATING SYSTEM

Andrew Longacre, Exeter, N. H.

Application May 2, 1945, Serial No. 591,590

6 Claims. (Cl. 343—11)

This invention relates to a method of locating aircraft or other objects with reference to space coordinates such as height, range and azimuth, and particularly to a method of locating objects in which a form of radio beam is employed.

It is often desirable for an aircraft in flight to locate the position of another object in space, for example, a second aircraft in flight, relative to its own position. In order to locate the target with reference to the searching aircraft, the space coordinates of the target relative to said aircraft must be known. Systems have been devised for measuring range, azimuth and elevation that make use of a plurality of radio beams which are maintained in a predetermined angular relationship. Systems of this character known heretofore are not suitable for use by aircraft in flight, or would require extensive alteration to adapt them even moderately well to such usage.

It is an object of this invention, therefore, to present a novel and simple method for obtaining data indicative of the position of a target in space with respect to an aircraft in flight by means of a plurality of radio beams maintained in a predetermined angular relationship.

In accordance with the present invention there is provided means for producing a first beam and a second beam of electromagnetic energy. Suitable receiver means are provided to detect electromagnetic energy that may be reflected from objects in space. Indicator means associated with the receiver means is used to display the signals obtained from the receiver.

For a better understanding of the invention, together with other and further objects thereof, reference is had to the following description taken in connection with the accompanying drawing, in which.

Figure 1:
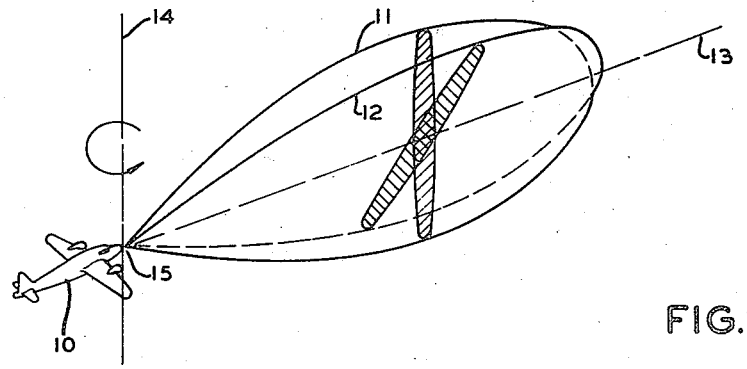
Fig. 1 is a perspective view showing the placement of the beams of radio-frequency energy.

Referring now more particularly to Fig. 1, there is shown an aircraft 10 which will be regarded as the searching aircraft. In accordance with the invention suitable radiating means (Fig. 4) are provided on aircraft 10 for producing two intersecting beams of pulsed electromagnetic energy. These beams, respectively designated 11 and 12 in Fig. 1, are substantially flat, and they intersect along a predetermined line 13 which, when the beams are forward of the aircraft as shown, may coincide with the longitudinal axis of the plane. Line 14 represents an axis perpendicular to line 13 about which beams 11 and 12 may be rotated. Axis 14 and line 13 intersect at a point 15 which is located on aircraft 10.

Figure 2:
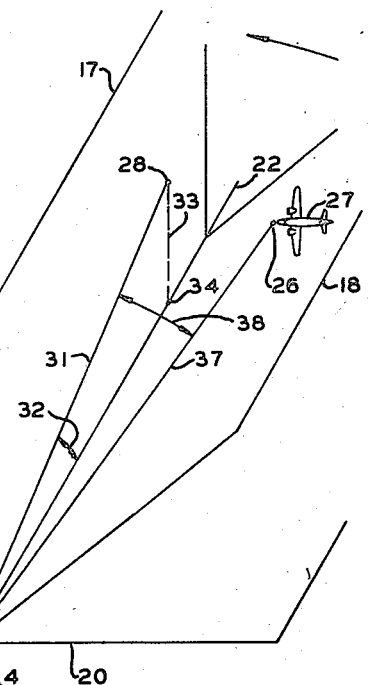
Fig. 2 is a diagram showing the geometry involved in determining the position of the target.

Referring now to Fig. 2, there are shown in diagrammatic form the elements of data necessary to determine the position of a target in space relative to aircraft 10. Plane 17 represents beam 11 of Fig. 1, and plane 18 represents beam 12. Plane 17 may be assumed perpendicular to the plane of the wings of the aircraft as a particularly simple case, while plane 18 slants from the upper right to the lower left when looking from the origin 24 along the line 22. Planes 17 and 18 intersect along a line 22 corresponding to line 13 of Fig. 1. A line 23 in plane 17 is perpendicular to the line 22, these two lines intersecting at point 24. Line 23 of Fig. 2 corresponds to axis 14 of Fig. 1, it being assumed that the planes 17 and 18 rotate in unison about this line. As the planes 17 and 18 rotate, line 22 describes a plane 20 which is perpendicular to the axis of rotation. Radiant energy in the beam 11, Fig. 1, impinges upon a target 27 at a point 28 in the plane 17, Fig. 2. At a different time, radiant energy in the beam 12, Fig. 1, impinges upon the target 27 at a point 26 in the plane 18, Fig. 2. Line 31 in plane 17 represents the distance between points 24 and 28, that is, the range of the target, while angle 32 represents the angle between line 31 and line 22. Line 33, which intersects line 22 at point 34, represents the perpendicular distance from point 28 to line 22. The line in plane 18 joining points 24 and 26 is numbered 37 and, like line 31, is equal in length to the range of the target 27. The angle 38 is the angle subtended at point 24 by the range lines 31 and 37. It is assumed here that the target remains relatively stationary while being scanned by the beams, or that suitable correction for target movement is provided by the receiving apparatus.

Figure 3:
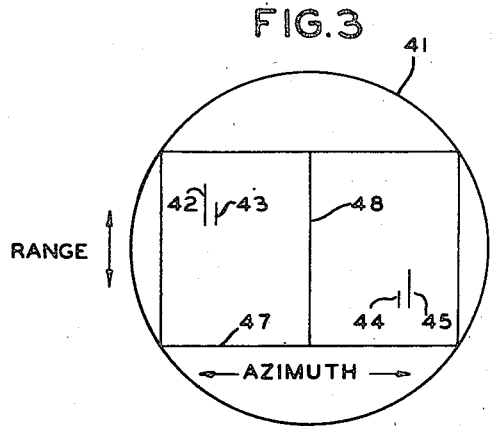
Fig. 3 is a simplified view of a typical indicator screen that is used with this system.

Referring now to Fig. 3, there is shown an indicator screen 41. Lines 42, 43, 44 and 45 represent target signals for two different targets. On screen 41 the distance from line 47 to the lower end of a target signal is a measure of the range to that target, the distance on the indicator screen being measured parallel to axis 48 of the screen.

The distance from axis 48 to a selected target signal measured parallel to line 47 represents the angle between the projection of the line of sight to that target upon the plane 20 and a predetermined reference line in said plane. Angles to the left of the reference line are represented by distances to the left of axis 48 and angles to the right are represented by distances to the right of axis 48. It will be recognized that this indicator is of the type that is known to the art as a "B scope."

It can be seen from Fig. 1 that two different conditions of operation may prevail. The first condition is that axis 14 is maintained perpendicular to the plane of flight of the aircraft. If this is true, line 13 will describe a plane parallel to the plane of flight of the aircraft as beams 11 and 12 rotate about axis 14. The second condition is that axis 14 may be maintained in a vertical position by suitable gyromechanisms regardless of the plane of flight of the aircraft. In this second condition of operation line 13 would describe a horizontal plane as beams 11 and 12 rotate in azimuth about axis 14. It is obvious that suitable means may be included for switching from one condition of operation to the other. For purposes of explanation it will be assumed that the aircraft 10 of Fig. 1 is in level flight so the operation under both conditions stated above is the same. Thus, plane 20, Fig. 2, is horizontal while plane 17 and axis 23 are vertical. Angle 32 is the elevation of the target 27 from the aircraft 10. Line 33 is the relative height of the target.

Figure 4:
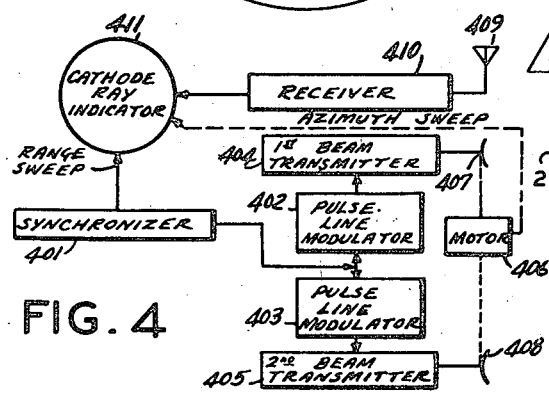
Fig. 4 shows a block diagram of a typical transmitter for producing the beams of radio frequency energy and a receiver for detecting the echo signals.

Fig. 4 shows a preferred embodiment of the invention. Synchronizer 401 produces a series of short periodic trigger pulses. The trigger pulses are applied to each of conventional pulse line modulators 402 and 403. A pulse line modulator produces an output pulse which is initiated in time coincidence with the leading edge of a trigger pulse applied thereto and which has a duration dependent upon the delay characteristics of the pulse line. The delay characteristics of pulse line modulator 402 are relatively short compared with the delay characteristics of pulse line modulator 403. Output pulses from pulse line modulators 402 and 403 are applied, respectively, to pulse modulate first beam transmitter 404 and second beam transmitter 405. The outputs of transmitters 404 and 405 are radiated from antennas 407 and 408, respectively. Both antennas 407 and 408 are arranged to radiate beams having a flat, fan-shaped radiation pattern. However, antenna 408 is so oriented relative to antenna 407 that the beams radiated therefrom are vertically divergent. Antennas 407 and 408 are rotated in unison in azimuth by means of motor 406. Echoes from objects intercepted by said beams are picked up by antenna 409, received by receiver 410, and then applied to cathode ray indicator 411 where they are d to intensity modulate the cathode ray thereof. gger pulses from synchronizer 401 are also applied to icator 411 where they are used to synchronize the ge sweep of the cathode ray (preferably in the vertical :ction) in a conventional manner. Indicator 411 is vided with an azimuth sweep (preferably in the horiital direction) by means of a mechanical coupling to tor 406, whereby the azimuthal deflection of indicator is maintained in accordance with the azimuthal direc1 of antennas 407 and 408.

n the preferred embodiment of the invention beam 11 naintained in a vertical plane, and beam 12 is mainied at an angle of, say, 45 degrees with respect thereto. h beams 11 and 12 rotate together about axis 14 in ler direction but preferably in a counterclockwise :ction when viewed from above. In this embodiment he invention the beams 11 and 12 are separately transted, as shown in Fig. 4, for a purpose which will be le apparent hereinafter. Signals in beam 11 are in form of relatively short pulses while the signals fed beam 12 are pulses of somewhat longer time dura-ι than the pulses in beam 11. If an object is presin the space scanned by beams 11 and 12, a portion he transmitted energy will be reflected from the object a portion of the reflected energy will be detected by :iving means located in aircraft 10.

he received signals are presented on the indicator :en 41 of Fig. 3. Signals from beam 11 form a relaly short line on screen 41, as illustrated by either indications 43 and 44, while signals from beam 12 se relatively long indications, as illustrated by either ndications 42 and 45. It should be understood that other equivalent method of distinguishing the target tals may be employed, such as by shutting off beam except when a relative height determination is to be le. The distance from line 47 to an indication is portional to the actual distance or range from the :raft to the target. The azimuth of the target is inited by the displacement of the indication from beam relative to line 48, this corresponding to the position beam 11 in azimuth as of the moment that the signal n beam 11 is received. The indication from beam appears on the indicator screen in a position corrending to the azimuth of beam 11 at the instant the ıal from beam 12 is received. The azimuth refere line may be the line of flight of the aircraft.

lach object in space that is within the area scanned beams 11 and 12 will cause two indications to appear the indicator screen 41. In Fig. 3 signals 42 and 43 icate a target at a relatively long range that is to left of the azimuth reference line and above the airft. The fact that the object is above the aircraft y be determined by observing that beam 11 illuminated target before beam 12 as they rotated together in a nterclockwise direction, causing the shorter echo line ndication 43 to be positioned to the right of the long ication 42. On the other hand, signals 44 and 45 resent a target that is at a relatively short range, to right of the azimuth reference line and below the :raft. The positions of the indications 43 and 44 reprei the true azimuth and range to the targets while the cing between the two indications from a single target ndicative of the height of the object with respect to horizontal plane described by line 13, Fig. 1, as it ites.

The means by which the height of the object causing reflection may be determined will be better under->d by reference to Fig. 2. It is obvious from Fig. 2 t target 27 would intersect planes 17 and 18 at the ie instant if target 27 were in the plane 20. Under se circumstances the two target indications on screen of Fig. 3 would coincide. If target 27 is above or ow plane 20, target 27 will intersect planes 17 and at different instants. If target 27 is at a height 33 ıve plane 20 and at a range 31 from point 24, it will ersect plane 17 at point 28. After planes 17 and 18 ate through an angle 38, target 27 will intersect plane at point 26, the beams being assumed to rotate ınterclockwise as viewed from above. The angle resented by the distance between the indications 42 and 43 on the indicator screen 41 of Fig. 2, therefore, l be angle 38. It can be shown that height 33 is a iction of the distance 31 and angle 38, if the angles ween planes 17, 18, and 20 are fixed. A mathematical ression of this relationship is derived in the copending application of Andrew Longacre, Serial No. 566,162, filed December 1, 1944.

By a similar analysis it can be seen that in the case of a target below the aircraft, the relative height thereof is indicated by the spacing between the target signals 44 and 45. The longer signal 45 is in this instance to the right of signal 44, since beam 12 is in the lead below the plane of flight of the aircraft. Range and azimuth are determined as before.

Since the height of an object relative to aircraft 10 is proportional to the distance, in the display, Fig. 3, between the target indication and line 47, and is also proportional to the spacing between the two indications produced by a single target, a suitable scale or overlay may, if desired, be placed over screen 41 so that the height of the target may be read directly from lines or scales on the overlay. A scale of the type referred to above is disclosed in the copending application of Richard W. Lee, Serial No. 566,164, filed December 1, 1944. In an airborne system such a device may not be required, it being necessary merely to point the aircraft so that the target indications occur in a patricular position in the display.

The advantages of this system are believed to be obvious from the foregoing description. The operator of the radio object-locating set in the aircraft may tell at a glance the position of a selected object that lies within the area of space scanned by the system. Approximate position can be easily obtained without computation since the position right or left of the axis 48 of the indicator screen 41 indicates target positions right or left of the azimuth reference line. If only a single indication appears on the indicator screen 41 for a selected target, the target is in the reference plane of the system. If two indications appear, the position of the larger indication with respect to the smaller indication furnishes information as to the direction and distance of the object above or below the reference plane. Range is determined by the displacement of the indications from the line 47.

If the reference plane selected is a horizontal plane, the operator of the aircraft having the object-locating equipment will have range, azimuth, and relative height data of all objects within range of his equipment. If the plane of flight is selected as the reference plane, the operator may cause his aircraft to "home" on a target by orienting his aircraft so that the selected target is at zero azimuth relative to the line of flight of the aircraft and at zero height relative to the plane of flight. The aircraft may be made to arrive at a predetermined distance above or below the selected target point by maintaining the distance of the target to the plane of flight of the aircraft as seen on the indicator screen 41 at some predetermined value.

Since all the data obtained by this system is presented on one indicator, and no adjustments or rate settings are required, this type of system is especially well adapted for use where the operator of the radio object-locating set must also pilot the aircraft.

It is evident that the method is equally applicable to the purpose of enabling the pilot to avoid an object rather than traveling toward it. The system may also be adapted to work in conjunction with radio beacons.

While there has been described what is at present considered the preferred embodiment of the invention, it will be obvious to those skilled in the art that various changes and modifications may be made therein without departing from the invention.

What is claimed is:

1. A system of radio object location which includes means for establishing two similar flat substantially plane pulsed beams of radiant energy having a fixed angle of inclination in elevation relative to each other and intersecting in a straight line which is so located that both of said beams are substantially symmetrical about said straight line, means for maintaining one of said beams substantially vertical, means for rotating said beams in unison about a substantially vertical axis, means for distinguishing the echoes formed by each of said beams impinging on an object, and cathode ray means for indicating the relative position of the object in response to said echoes.

2. A system of radio object location which includes means for establishing two similar flat substantially plane pulsed beams of radiant energy having a fixed angle of inclination in elevation relative to each other and intersecting in a straight line which is so located that both of said beams are substantially symmetrical about said straight line, means for maintaining one of said beams substantially vertical, means for rotating said beams in unison about a fixed axis, means for distinguishing the echoes formed by each of said beams impinging on an object, and cathode ray means for indicating the relative position of the object in response to said echoes.

3. A system of radar object location which includes means for establishing two similar flat substantially plane beams of radiant energy having a fixed angle of inclination relative to each other and intersecting in a straight line which is so located that both of said beams of radiant energy are substantially symmetrical about said straight line, and means for rotating said beams about a vertical axis in unison so as to maintain the relative angle of inclination and relative placement of said beams constant.

4. In an aircraft, a radio object locating system comprising first and second means respectively including first and second antennas for simultaneously transmitting respective first and second beams of radiant energy pulses having flat, substantially plane radiation patterns, said first antenna being oriented to radiate said first beam in a vertical plane, said second antenna means being oriented to radiate said second beam in a plane inclined in elevation relative to said first beam by an appreciable angle and to intersect said first beam in a substantially straight horizontal line, means for rotating said antennas in unison about a vertical axis, means for receiving the echoes formed by each of said beams impinging on an object, a cathode ray indicator having a screen, means for intensity modulating the cathode ray of said indicator with said received echoes to produce a visible indication on said screen in response to the received echoes of each respective beam, means for initiating the deflection of the cathode ray of said indicator along a first rectangular coordinate in synchronism with the transmission of each pulse in said first and second beams, means for deflecting the cathode ray of said indicator along a second rectangular coordinate in accordance with the azimuthal direction of said first beam, whereby the position of the indication of the received echoes of said first beam on said screen is indicative of the range and azimuth of said object relative to said aircraft and the difference in azimuth between the indications of the received echoes of said first and second beams is indicative of the height of said object relative to said aircraft.

5. A radio object locating system in accordance with claim 4, including means for modifying the pulses transmitted in said first beam from the pulses transmitted in said second beam, whereby the indication produced by received echoes of said first beam may be readily distinguished from the indication produced by received echoes of said second beam, and the orientation of the indication of said first beam relative to the indication of said second beam is indicative of whether said object is above or below said aircraft.

6. A radio object locating system according to claim 5, wherein said modifying means renders the duration of each pulse of said first beam of a different length than the duration of each pulse of said second beam.

References Cited in the file of this patent

UNITED STATES PATENTS

| | | |
|---|---|---|
| 2,231,929 | Lyman | Feb. 18, 1941 |
| 2,297,395 | Erben | Sept. 29, 1942 |
| 2,308,019 | Morawetz | Jan. 12, 1943 |
| 2,402,410 | Kear | June 18, 1946 |
| 2,415,095 | Varian | Feb. 4, 1947 |
| 2,538,800 | Ranger | Jan. 23, 1951 |